Jan. 13, 1953    B. F. SPENCER    2,625,650
SUPERREGENERATIVE APPARATUS
Filed Oct. 16, 1948    3 Sheets-Sheet 1
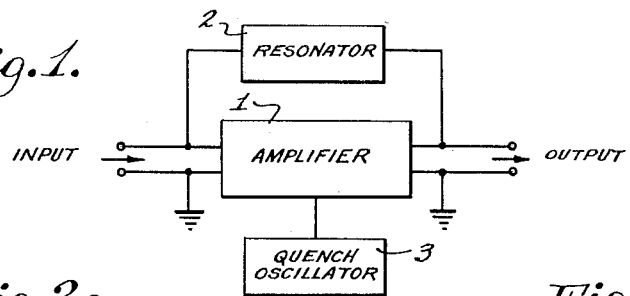
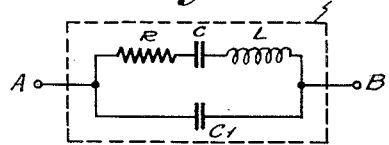
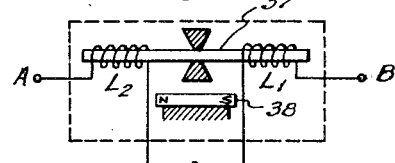
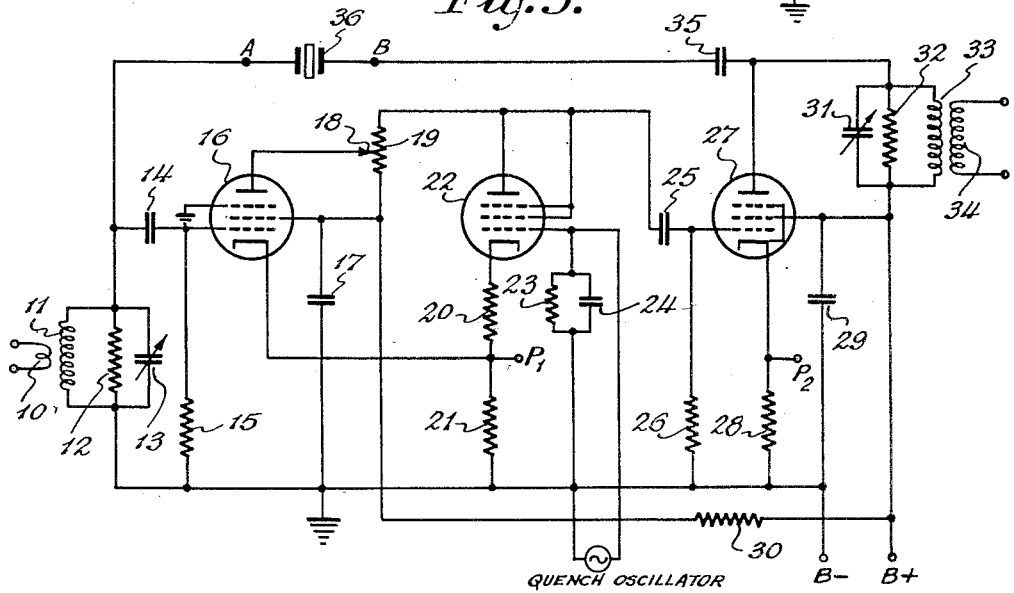
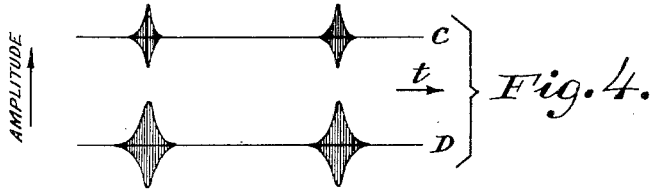
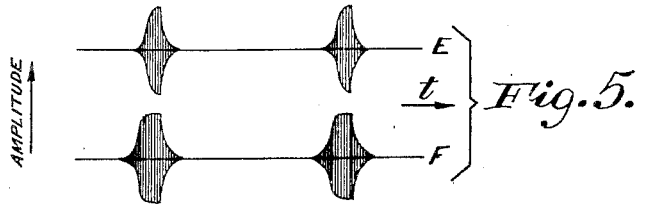
INVENTOR
BENJAMIN F. SPENCER
BY
Thomas M. Ferrill Jr.
ATTORNEY INVENTOR
BENJAMIN F. SPENCER
BY
Thomas M. Ferrill Jr.
ATTORNEY

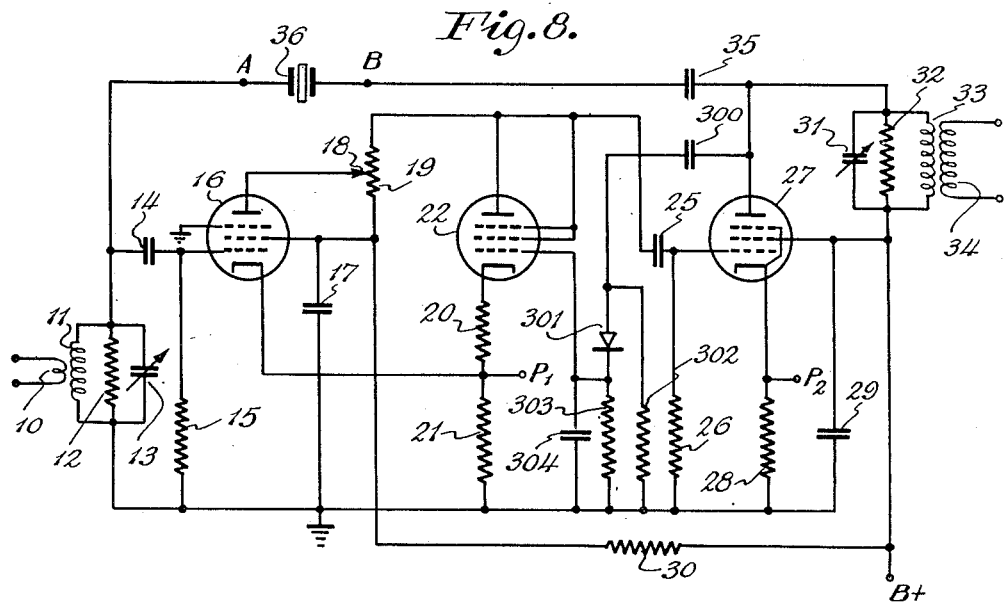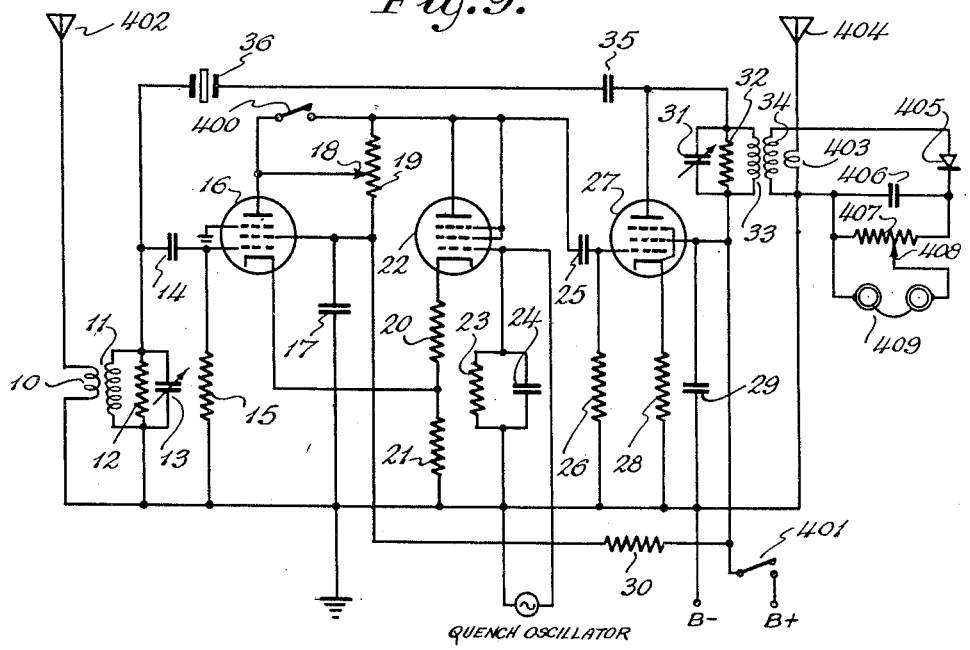

Patented Jan. 13, 1953

2,625,650

UNITED STATES PATENT OFFICE 2,625,650

SUPERREGENERATIVE APPARATUS

Benjamin F. Spencer, Hempstead, N. Y., assignor to The Sperry Corporation, Great Neck, N. Y., a corporation of Delaware Application October 16, 1948, Serial No. 54,863

3 Claims. (Cl. 250—20)

This invention relates to superregenerative apparatus and in particular to superregenerative apparatus employing an electromechanical resonator.

Superregeneration may be defined as the condition in a regenerative system that recurrently produces a growing transient of oscillation, prevented from becoming a sustained oscillation by means of a quenching action repeated at a suitable uniform rate. A superregenerative circuit, as known in the art, comprises an oscillation system which is periodically modulated or quenched at a frequency which is less than that of the generated oscillations and greater than the modulating frequency of the signal wave to be amplified.

A superregenerative circuit may have at least two distinct modes of operation determined largely by the operating potentials applied thereto and the quenching action. In the linear mode, the quenching action is such that the oscillations generated in each quench cycle are quenched or damped before attaining saturation amplitude. In the logarithmic mode, the generated oscillations are permitted to reach saturation amplitude in each quench cycle before they are damped. The circuit is characterized by a high gain and the average amplitude of the output signal voltage derived therefrom in any quench cycle varies with the amplitude of the exciting signal wave which initiates the oscillations generated. The circuit is further characterized by the fact that during quiescent intervals, when no desired signals are being received, oscillations are initiated by the noise signals present in the circuit, resulting in an output signal voltage proportional to the noise. The quenching action may be derived from a separate quench oscillator or obtained inherently by the method known as "self-quenching."

One of the problems of achieving good results with the superregenerative circuit is the fact that when radio frequency regenerative feedback is made strong, the interrupting quench frequency voltage does not completely quench the generated oscillations. In other words, before the full effect of the damping cycle is achieved, the oscillation generator begins again to build up the incompletely quenched oscillations, producing more or less sustained oscillations. In an article entitled "A Balanced Modulator Superregenerative Circuit" by W. Van B. Roberts in QST, July 1932, page 19, there is described a quenching method which eliminates this difficulty by employing a feedback connection which is termed a reverse or negative feedback, in opposition to the positive or regenerative feedback, and the reversed feedback action is periodically substituted for the regenerative feedback by the quench oscillator.

The superregenerative circuit disclosed by Roberts employs two independent feedback loops, one regenerative and the other degenerative. The regenerative feedback loop associated with a first electron tube magnetically couples oscillatory energy from a feedback inductor coil to a parallel resonant circuit. The degenerative feedback loop associated with a second electron tube magnetically couples energy in a reverse sense from a second feedback inductor coil to the parallel resonant circuit. The separate quench oscillator periodically substitutes the regenerative feedback for the degenerative feedback by alternating between a conductive path through the first electron tube and a conductive path through the second electron tube.

One limitation of this superregenerative circuit is the necessity for two feedback loops. This requirement in addition to employing two tubes also limits the type of oscillator circuit that may be employed as will later become apparent from the description of the present invention. A second limitation is the necessity for magnetic coupling from the two feedback loops to the parallel resonant circuit. This feedback arrangement is especially limited to certain oscillatory systems and cannot be employed in others as will be subsequently explained.

Superregenerative circuits of the prior art have employed lumped parameters of inductance and capacitance as the resonant circuit in which the free oscillation currents are generated. Transmission line resonators as well as cavity resonators also have been employed as the resonant circuit element. These resonant circuits all possess moderate Q, that is, a moderate ratio of equivalent inductive reactance to equivalent series resistance. The frequency of the free oscillation current which is the frequency of reception of a superregenerative circuit is determined largely by the equivalent values of circuit inductance and capacitance in the resonant circuit. Variations in the value of resonant circuit inductance and capacitance due to changes in temperature or aging as well as indirect variations due to voltage changes directly affect the frequency of reception or amplification of these prior superregenerative circuits. This has resulted in highly undesirable instability of the frequency of reception as well as inaccurate calibrations of the tuning indicator mechanism.

This is especially true due to the necessity of quenching or modulating the free oscillation current in the resonant circuit. Fixed frequency superregenerative circuits of the prior art have not possessed sufficient frequency stability to fulfill the stringent requirements of many types of services.

In accordance with this invention, there is introduced a new and improved superregenerative circuit employing an electromechanical resonator as the resonant circuit element. This circuit arrangement eliminates both directly and indirectly many of the disadvantages present in prior arrangements and affords paramount improvement in the overall stability of the superregenerative circuit.

A major feature of this invention is a superregenerative circuit arrangement comprising an electromechanical resonator.

An important object of the invention is to provide a superregenerative receiver of improved frequency stability.

Another object is to provide a transmitter-receiver arrangement whose frequency of transmission and reception is one and the same, and is determined by a single electromechanical resonator.

An additional object is to provide a modulated electromechanical oscillator circuit arrangement with improved modulation characteristics.

Yet another object is to provide a simplified electromechanical wave translator.

These and other objects and features of the invention will be described more fully in the following detailed description.

Fig. 1 is a simplified block diagram of one embodiment of the invention.

Fig. 2a is a basic electrical equivalent circuit of a type of resonator employed in the invention.

Fig. 2b is another type of resonator adaptable to the invention.

Fig. 3 is a schematic diagram of a preferred superregenerative circuit arrangement in accordance with this invention.

Fig. 4 shows a pair of wave forms characteristic of one mode of operation of the invention.

Fig. 5 shows a second pair of wave forms characteristic of a second mode of operation of the invention.

Fig. 8 is a schematic diagram of the preferred circuit arrangement with a provision for self-quenching.

Fig. 9 is a schematic diagram of a transmitter-receiver in accordance with this invention.

Figure 6:
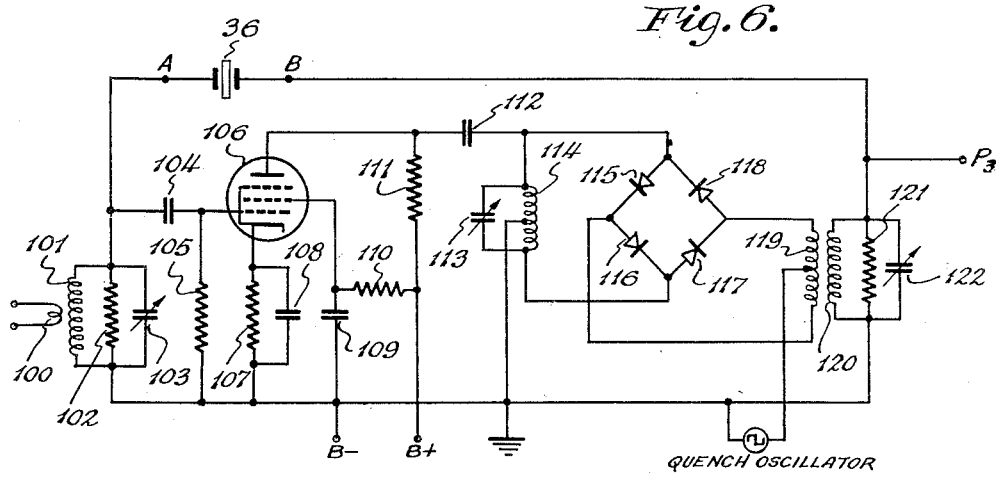
Fig. 6 is a schematic diagram of a modified superregenerative circuit arrangement of the invention.

The block diagram of Fig. 1 shows a resonator 2 of the type employed in the invention coupling the input and output circuit of amplifier 1. A separate quench oscillator 3 is coupled to amplifier 1. This block diagram briefly illustrates the superregenerative apparatus of the invention. This apparatus functions to amplify voltage waves of the frequency of resonator 2 applied to the input circuit, the amplified version appearing across the output circuit.

The basic electrical equivalent circuit of one type of electromechanical resonator is shown in Fig. 2a. A capacitance $C_1$ is shown coupled between terminals A and B. In parallel with $C_1$ is a series connection of resistance R, capacitance C, and inductance L. It is to be understood that these equivalent parameters constitute the medium that is the resonator and cannot be isolated therefrom. These equivalent parameters characterize the resonator at some particular vibrational mode and will have different equivalent values at different vibrational modes.

Electromechanical resonators may be classified according to several different types. Two types adaptable to this invention are the piezoelectric type and the metallic vibrational type. Several types of piezoelectric resonators are quartz, tourmaline, Rochelle-salt, and tartrate crystals. The magnetostrictive resonator is one example of a metallic vibrational resonator.

Fig. 2b shows a magnetostrictive resonator. The magnetostrictive rod 37, supported midway its length, is excited magnetically at its mechanical resonant frequency by input inductor $L_1$. Permanent magnet 38 premagnetizes the magnetostrictive rod 37. Output inductor $L_2$ magnetically coupled to rod 37 serves to remove energy therefrom.

Electromechanical resonators and especially certain piezoelectric resonators possess very high Q. Because of this very high Q, it is an exceedingly difficult problem to build up free oscillation in the resonator within the short periods of time required for superregeneration. The free oscillation must be started from a non-oscillatory condition and must build up exponentially to a large amplitude within the regenerative period of the periodically varying quench voltage. If the free oscillation is to be initiated by the noise signals present in the circuit and if the free oscillation is to grow in amplitude to such a value as to saturate a sharp cut-off electron tube, then the growth in amplitude during the regenerative period of the quench voltage may be as large as 10,000,000 times. Likewise, the free oscillation in the resonator must decay during the degenerative period of the periodically varying quench voltage from the high amplitude back to the noise level of the circuit. As is well known, when a high Q resonator is excited into oscillation, it continues to oscillate long after the excitation is removed. The problem of damping this continuing oscillation in a very short interval is as difficult if not more so than the problem of rapidly building up the free oscillation.

The inductive element and the capacitive element of an electromechanical resonator are inseparable as previously stated. The quenching problem becomes increasingly complicated because of this inseparability of C and L for, as can be seen, it is impossible to make separate connections or couplings to the inductive or the capacitive element within the resonator itself. As a result, many of the known quenching methods which would otherwise have been satisfactory, including magnetic feedback coupling, are completely unusable.

In accordance with the teaching of this invention, there is disclosed an arrangement which has been found satisfactory in solving these problems. One arrangement comprises the electromechanical resonator arranged in the feedback loop of a controlled amplifier. Feedback currents of the frequency of the resonator are transmitted therethrough. The controlled amplifier greatly amplifies these feedback currents and a provision is made by which the feedback through the resonator can be made either positive or negative according to a control voltage applied to the amplifier. The result is to obtain a short period of regenerative oscillation during a positive feedback cycle and a short period of degenerative damping during the negative feedback cycle, alternating therebetween at a selected quench frequency, thereby producing superregeneration.

In reference to Fig. 3, an input inductor 10 is magnetically coupled to inductor 11. Condenser 13 is coupled in parallel with inductor 11 to form a resonant circuit, which is loaded by resistor 12. The upper terminal junction of the resonant circuit is coupled to the control-electrode of electron tube 16 through a coupling condenser 14. The lower terminal of the resonant circuit is returned to a common grounding terminal. Resistor 15 returns the control-electrode of tube 16 to the ground terminal. The screen-grid electrode of tube 16 is by-passed to ground by condenser 17. The plate or anode of tube 16 is coupled to arm 18 of potentiometer 19. This potentiometer serves as a common plate load resistance to tube 16 and tube 22 as the upper end of the potentiometer couples directly to the plate of tube 22. The cathode of tube 16 is coupled to the cathode of tube 22 through resistor 20. Resistor 21 returns the cathode of tube 16 to ground. The control-electrode of tube 22 is returned to ground through resistor 23. By-pass condenser 24 is coupled in shunt with resistor 23. The quench oscillator is coupled between the control-electrode of tube 22 and ground. The plate of tube 22 is coupled to the control-electrode of tube 27 by condenser 25. Resistor 26 returns this control-electrode to ground. Cathode bias for tube 27 is provided by resistor 28. Condenser 29 by-passes the screen-grid of tube 27 to ground. The plate load impedance of tube 27 comprises a parallel resonant circuit of condenser 31, resistor 32, and inductor 33. The output inductor 34 is magnetically coupled to inductor 33. Resistor 30, together with condensers 17 and 29, serves as a decoupling filter. Condenser 35 couples the plate of tube 27 to terminal B of resonator 36 and terminal A of resonator 36 is coupled through condenser 14 to the control-electrode of tube 16, thus forming a feedback loop. The direct voltage for the circuit is applied to the B— and B+ terminals.

The basic function of this circuit is to alternately build up and completely damp free oscillation in the resonator 36. An additional function of the circuit is to control the amplitude variation of the free oscillation, or the time variation of the free oscillation, or both in accordance with a control voltage. These functions are in accordance with the basic principles of superregeneration.

The operation of the circuit of Fig. 3 can best be understood by first opening the single feedback loop by removing resonator 36. The parallel resonant circuit comprising inductor 11 and condenser 13 and the resonant circuit of inductor 33 and condenser 31 are tuned to the resonant frequency of the resonator 36. Each of the three tubes operates as a class A bandpass amplifier when no quench voltage is applied. It is noted that tube 16 is cathode-coupled to tube 22. Tube 16 is also plate-coupled to tube 22 through the potentiometer 19. Consider now a sinusoidal voltage of the frequency of the resonator applied to the control-electrode of tube 16. This applied voltage will be amplified by tube 16 and the output voltage across the potentiometer from arm 18 to ground will be 180° out of phase or inverted with respect to the applied voltage.

Consider next the operation of tube 16 and tube 22 when the arm 18 of potentiometer 19 is adjusted so that the plate of tube 16 is coupled directly to the screen-grid. Due to the cathode coupling between tubes 16 and 22, an amplified version of the applied voltage will appear across potentiometer 19, from the plate of tube 22 to ground, as the circuit is now a cathode-coupled amplifier with the control-electrode of tube 22 essentially at ground potential due to the small capacitive reactance of condenser 24 at the frequency of the applied voltage. This amplified voltage is in phase with the applied voltage.

Now, by readjustment of arm 18 of potentiometer 19, a condition of complete cancellation of the two independently amplified voltages existing from the plate of tube 22 to ground may be obtained resulting in no output corresponding to the applied voltage. Upon application of a sinusoidal quench voltage from the quench oscillator to the control-electrode of tube 22, the gain of tube 22 is made to increase during positive half cycles of the quench voltage and to decrease during negative half cycles of the quench voltage. This produces, therefore, an amplified voltage from the plate of tube 22 to ground which is in phase with the applied voltage during positive half cycles of the quench voltage and is 180° out of phase or inverted with respect to the applied voltage during negative half cycles of the quench voltage.

This amplified voltage is applied through condenser 25 to the control-electrode of tube 27 where it is further amplified. The capacitive reactance of condenser 25 is small at the frequency of the amplified voltage, yet is large at the frequency of the quench voltage so as to prevent the quench voltage coupled through tube 22 from being applied to the control-electrode of tube 27. Tube 27 introduces an additional phase reversal such that the amplified voltage from its plate to ground is 180° out of phase or inverted with respect to the applied voltage during positive half cycles of the quench voltage and is in phase with the applied voltage during negative half cycles of the quench voltage.

Now, upon insertion of resonator 36 completing a feedback loop from the plate of tube 27 to the control-electrode of tube 16, a condition is established which will alternately build up and completely damp free oscillation in the resonator. A period of regenerative oscillation exists during the negative half cycle of the quench voltage as positive feedback currents are transmitted through the resonator and free oscillations are generated in the resonator. An applied voltage is no longer required as the noise in the circuit will initiate the free oscillation. The oscillations build up rapidly due to the large amplification present during the regenerative period. A period of degenerative or dynamic damping exists during the positive half cycle of the quench voltage as the feedback through the resonator is negative and the free oscillations are completely damped.

The voltage produced by the free oscillation current during quenching may be observed on a cathode-ray oscilloscope by coupling the input of the vertical deflection amplifier to either test point $P_1$ or $P_2$ and ground. Figure 4 shows the voltage wave forms when the circuit is operating in the linear mode. The wave form at C shows the superregenerative voltage in the absence of an applied signal wave. The amplitude of the oscillations for a fixed level of quench voltage is proportional to the noise in the circuit and is thus random. The amplitude and duration of the oscillations increase upon application of an input voltage wave to inductor 10 as shown by wave form D. An increase in the level of the quench voltage will also result in an increase in the amplitude of the superregenerative oscillations.

Figure 5 shows the voltage wave forms when the circuit is operating in the logarithmic mode. This mode of operation may be obtained by increasing the level of the quench voltage until the amplitude of the superregenerative oscillations become saturated as at E. Saturation occurs in the first tube 16 when its control-electrode is driven positive by strong oscillations causing a bias voltage to be developed across resistor 15. Wave form E shows the no-signal condition while wave form F shows the signal condition. The amplitude of the saturated oscillations remains constant with an applied signal wave while the duration of the oscillations increases.

Potentiometer 19 affords a means by which the ratio of the amount of regeneration to the amount of degeneration can be controlled. This is accomplished by small adjustments in potentiometer arm 18. As the arm 18 of the potentiometer is slightly advanced such that the potential of the plate of tube 16 is made to approach the potential of the plate of tube 22, the amount of regeneration or positive feedback increases with respect to the amount of degeneration or negative feedback. The rate of storage of energy into the resonator 36 is thereby increased and the build-up time of the oscillations to reach a fixed level of amplitude is decreased. Thus, the ratio of the build-up time to the decay time can be controlled.

Adjustments of tuning condensers 13 and 31 have no noticeable effect on the frequency of the free oscillations. Detuning of these condensers reduces the amplification available at the frequency of the resonator and thus reduces the amount of regeneration and degeneration. This, in turn, reduces the amplitude of the free oscillations. A small phase shift also results from detuning these condensers from their preset positions. This further alters the amount of regeneration and degeneration and thus the amplitude of the free oscillations.

It may further clarify the operation of this circuit to consider the following list of circuit constants which are given purely by way of illustration of one version of the invention.

Resistors

| element | resistance | element | resistance |
|---|---|---|---|
| | Ohms | | Ohms |
| 12 | 10,000 | 23 | 130,000 |
| 15 | 270,000 | 26 | 47,000 |
| 19 | 0-5,000 | 28 | 120 |
| 20 | 150 | 30 | 5,000 |
| 21 | 150 | 32 | 10,000 |

Condensers

| element | capacitance | element | capacitance |
|---|---|---|---|
| 13 | 200 mmfd. | 25 | .001 mfd. |
| 14 | .01 mfd. | 29 | .1 mfd. |
| 17 | .1 mfd. | 31 | 150 mmfd. |
| 24 | .001 mfd. | 35 | .01 mfd. |

Inductors

| element | inductance | element | inductance |
|---|---|---|---|
| 11 | 2.0 mh. | 33 | 2.5 mh. |

Tubes

16—6AS6
22—6AS6
27—6AK5

Voltages

Quench oscillator=1.09 volts R. M. S. sinusoidal, 80 cycles per second.
Direct voltage=+105 volts.

Resonator 36

498 kc. quartz crystal

A modified circuit arrangement is shown in Fig. 6. Inductor 100 is magnetically coupled to inductor 101. Condenser 103 coupled in parallel with inductor 101 forms a resonant circuit, which is loaded by resistor 102. The upper terminal junction of the resonant circuit is coupled to the control-electrode of tube 106 through condenser 104. The lower terminal of the resonant circuit is returned to ground. Resistor 105 returns the control-electrode to ground. Cathode bias for the tube is provided by resistor 107. The cathode is by-passed to ground by condenser 108. Condenser 109 by-passes the screen-grid to ground and forms a decoupling filter with resistor 110. The plate of the tube is coupled through condenser 112 to inductor 114. Condenser 113 in parallel with inductor 114 forms a second resonant circuit. Resistor 111 returns the plate to a source of positive voltage. The center-tap of inductor 114 is returned to ground. Rectifiers 115, 116, 117, and 118 are arranged with inductor 114 and inductor 119 to form a ring modulator. The quench oscillator is coupled between the center-tap of inductor 119 and ground. A third parallel resonant circuit comprising inductor 120, resistor 121, and condenser 122 has its upper terminal coupled to terminal B of resonator 36 and its lower terminal returned to ground. Inductor 120 is magnetically coupled to inductor 119. Terminal A of resonator 36 is coupled through condenser 104 to the control-electrode of the tube 106, thus completing a feedback loop. Resonant circuit 101, 103, circuit 113, 114, and circuit 120, 122 are tuned to the resonant frequency of resonator 36.

Tube 106 serves as a class A bandpass amplifier with a provision for grid circuit limiting for strong input signals. It amplifies voltage waves of the frequency of resonator 36 applied to its control-electrode. The function of the ring modulator is to reverse the phase of the feedback through resonator 36, two phase reversals occurring in each cycle of quench voltage. During a negative half cycle of the quench voltage, only rectifiers 115 and 117 are conductive. This results in a conductive coupling between the upper terminal of inductor 114 and the lower terminal of inductor 119. A conductive coupling also exists between the lower terminal of inductor 114 and the upper terminal of inductor 119. A period of regenerative oscillation exists as the feedback through resonator 36 is positive. During a positive half cycle of the quench voltage, only rectifiers 116 and 118 are conductive, and accordingly, the upper terminal of inductor 114 is coupled to the upper terminal of inductor 119 while the lower terminal of inductor 114 is coupled to the lower terminal of inductor 119. A period of degenerative damping of the oscillations in resonator 36 now exists as the feedback through the resonator is negative. Superregenerative operation is thus achieved. The amplified radio frequency output voltage is available between test point P₃ and ground.

Figure 7:
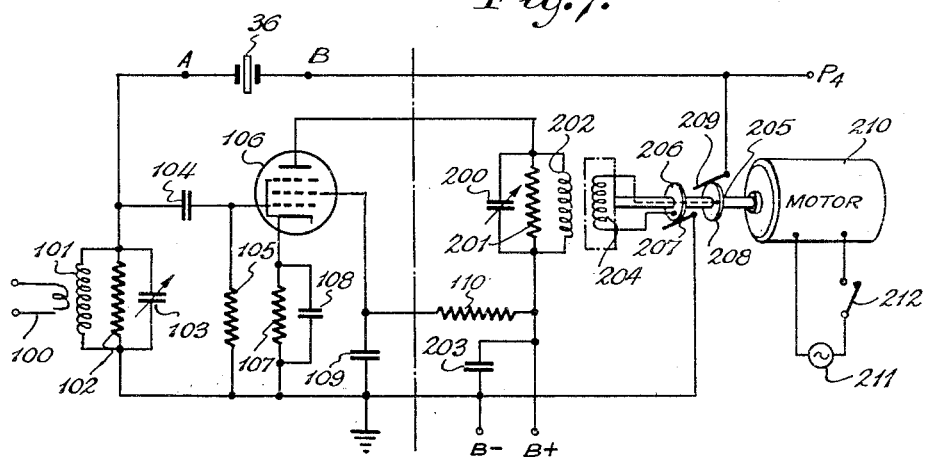
Fig. 7 is another modification of a simplified superregenerative circuit arrangement of this invention.

Another simple embodiment of the present invention is shown in Fig. 7. One inductor winding section 202 of the stator of a rotatable transformer or selsyn is coupled between the plate of tube 106 and the B+ terminal. In parallel with inductor 202 are connected condenser 200 and resistor 201 forming a parallel resonant circuit. Condenser 203 by-passes the lower terminal of the resonant circuit to ground. The rotor inductor winding 204 of the selsyn is magnetically coupled to inductor 202. One terminal of inductor 204 is coupled to slip ring 206 and the other terminal is coupled to slip ring 208. Brush 207 is returned to ground and brush 209 is coupled to terminal B of resonator 36. Terminal A of resonator 36 is coupled to the control-electrode of the tube through condenser 104, completing a feedback loop. Rotor inductor 204 is mechanically coupled to shaft 205 of motor 210. The motor 210 is energized by source 211 upon the closing of switch 212.

The function of tube 106 is the same as previously described. Upon rotation of inductor 204 with respect to inductor 202, a quenching action takes place, as a phase reversal of the feedback through resonator 36 occurs each half revolution of shaft 205. One full quenching cycle occurs per revolution of shaft 205; that is, one period of regenerative oscillation and one period of degenerative damping. The quench frequency in cycles per second is equal to the angular velocity of shaft 205 expressed in revolutions per second. Superregeneration is thus achieved and the amplified radio frequency output voltage is provided between test point P₄ and ground.

Figure 7A:
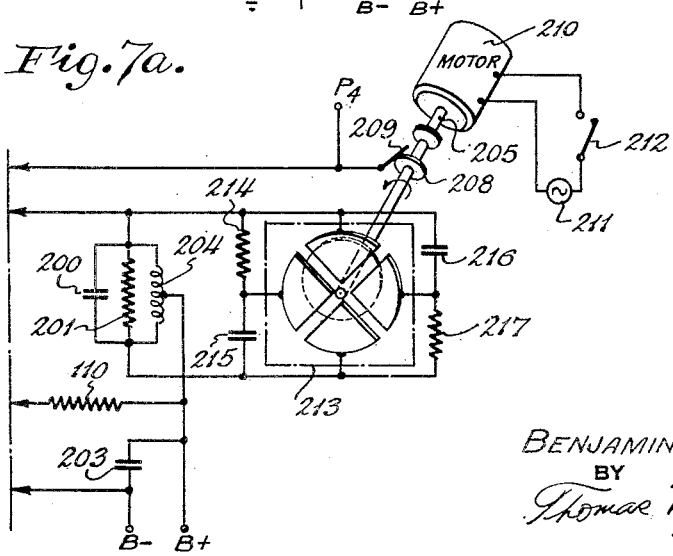
Fig. 7a is an alternative arrangement of the simplified circuit of Fig. 7.

A condenser phase shifter arrangement producing a continuously varying phase shift may be substituted in place of the rotatable transformer or selsyn as shown in Fig. 7a. The center-tap of inductor 204 is returned to the B+ terminal. Phase shifting networks comprising resistor 214, condenser 215 and condenser 216 and resistor 217 are coupled across inductor 204. Quadrature voltages are thus derived which are coupled to the four stator plates of the condenser phase shifter 213. The eccentric rotor plate of the phase shifter is coupled to slip ring 208 and brush 209 couples the slip ring to terminal B of resonator 36. As the rotor plate of the phase shifter is rotated by motor 210, a feedback current of varying phase is supplied through the resonator 36 and a period of regenerative feedback and a period of degenerative feedback is obtained for each revolution of shaft 205.

A modification of the preferred superregenerative circuit of Fig. 3 for rendering it self-quenching is shown in Fig. 8. In this arrangement, a condenser 300 couples the plate of tube 27 to the anode terminal of rectifier 301. The cathode terminal of this rectifier is coupled to the control-electrode of tube 22. The parallel combination of resistor 303 and condenser 304 couples the control-electrode of tube 22 to ground. Resistor 302 coupled from the plate terminal of rectifier 301 to ground provides a D. C. return for the rectifier.

The operation of the preferred circuit in Fig. 3 is such that during the negative half cycle of the quench voltage applied to the control-electrode of tube 22 the feedback is positive and a period of regenerative oscillation occurs. During the positive half cycle of the quench voltage, a period of degenerative damping occurs. Now, in reference to Fig. 8, the arm 18 of potentiometer 19 is adjusted so that positive feedback exists around the feedback loop when zero voltage exists between the control-electrode of tube 22 and ground. Regenerative oscillation will start to build up and this oscillation voltage is coupled from the plate of tube 27 to rectifier 301. This rectifier produces a positive voltage across resistor 303 with respect to ground which is proportional to the amplitude of the oscillation voltage. This results in a positive voltage applied to the control-electrode of tube 22. When this positive voltage exceeds a certain level, the phase of the feedback around the feedback loop reverses and degenerative damping starts. The parallel combination of resistor 303 and condenser 304 provides a time constant sufficient to hold the control-electrode positive until the regenerative oscillations are completely damped. With no oscillation voltage applied to rectifier 301, condenser 304 discharges, allowing the potential of the control-electrode of tube 22 to drop to a level at which regenerative oscillation can start again. The process thus repeats and self-quenching is obtained.

The following circuit constants were found satisfactory for self-quenching:

| element | value |
|---------|-------|
| 300 | 24 mmfd. |
| 301 | 1N34 crystal rectifier. |
| 302 | 1 megohm. |
| 303 | Do. |
| 304 | .05 mfd. |

The preferred superregenerative circuit is shown in Fig. 9 arranged as a transmitter-receiver apparatus. The same circuit may be used as a wave translator arrangement. Send-receive switch 400 is coupled directly between the plate of tube 16 and the plate of tube 22. Telegraph key 401 is inserted in series with the B+ lead. Antenna 402 is coupled to one terminal of inductor 10, the other terminal being connected to ground. Output inductor 34 is coupled to a conventional detector circuit comprising rectifier 405, condenser 406, potentiometer 407, arm 408, and headphones 409. An alternative antenna 404 used for radiating amplified signal waves is coupled to one terminal of an inductor 403 magnetically coupled to inductor 33. The other terminal of the inductor is returned to ground.

For transmitting on the frequency of resonator 36, send-receive switch 400 is closed thus establishing a condition of fixed positive feedback. Continuous oscillations are generated when key 401 is closed. Antenna 402 or alternative antenna 404 may be employed to radiate the radiotelegraph energy during periods of depression of telegraph key 401.

For receiving, send-receive switch 400 is opened and key 401 is closed. Antenna 402 collects the signal wave of the frequency of resonator 36 to be received and introduces it into the resonant circuit comprising inductor 11 and condenser 13. This signal wave initiates or advances the free oscillation in resonator 36 in accordance with superregenerative theory, and the amplified intelligence is detected and coupled to headphones 409. For code signals, the headphones produce an increase in the level of the detected superregenerative oscillations which occur at the quench frequency rate and this change in level, in accordance with the code signals, will be audible as the quench frequency is in the audio range. A beat frequency oscillator is therefore not required.

In the employment of the apparatus of Fig. 9 as a wave translator, the receiving connections are retained and signal waves collected by antenna 402 are amplified and retransmitted by antenna 404. The transmitted signal waves are pulses instead of modulated continuous waves and the pulses may be amplitude, width, or time modulated in accordance with received amplitude modulated signal waves. For the linear mode of operation and with a fixed quench frequency, the output pulses are amplitude modulated in accordance with the received amplitude variations as shown in Fig. 4. For the logarithmic mode of operation and with a fixed quench frequency, the output pulses are width modulated in accordance with the received amplitude variations as shown in Fig. 5. With self-quenching as per Fig. 8, the output pulses are time modulated, as the quench frequency increases with an increase in the amplitude of the received signal wave.

The apparatus of this invention may be employed as a modulated pulse generator by applying a locally derived modulating carrier voltage to the terminals of the input inductor of the superregenerative circuit instead of the received amplitude modulated signal waves. Where a separate quench oscillator is employed, an alternative arrangement for modulating the generated pulses is to apply a modulating potential to modulate the quench oscillator itself. In both arrangements, the generated output pulses may be amplitude, width, or time modulated in accordance with the locally applied modulating potential.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A superregenerative receiving circuit comprising a first electronic amplifier having an input circuit for receiving a signal voltage wave, said first amplifier having an anode output circuit and a cathode output circuit, a second electronic amplifier having a cathode input circuit coupled to the cathode output circuit of said first amplifier and having an anode output circuit coupled to the anode output circuit of said first amplifier, a feedback circuit including a series-connected piezoelectric crystal resonator between said interconnected anode circuits and said first amplifier input circuit for feeding back a version of the resultant output voltage produced in said interconnected anode circuits to said first amplifier input circuit, and means for regularly varying the gain of said second amplifier at a quench frequency appreciably lower than the resonant frequency of said piezoelectric crystal resonator for providing alternate degenerative feedback and regenerative feedback.

2. A superregenerative receiving circuit comprising a first electronic amplifier having an input circuit for receiving a signal voltage wave, said first amplifier having an anode output circuit and a cathode output circuit, a second electronic amplifier having a cathode input circuit coupled to the cathode output circuit of said first amplifier and having an anode output circuit coupled to the anode output circuit of said first amplifier, a feedback circuit including a resonator between said interconnected anode circuits and said first amplifier input circuit for feeding back a version of the resultant output voltage produced in said interconnected anode circuits to said first amplifier input circuit, and means regularly varying the gain of said second amplifier at a quench frequency appreciably lower than the resonant frequency of said resonator for providing alternate degenerative feedback and regenerative feedback.

3. The apparatus as defined in claim 2 wherein said means regularly varying the gain of said second amplifier includes a self quenching circuit for periodically varying the gain of said second amplifier according to the strength of a version of the resultant output oscillator voltage across said interconnected anode circuit.

BENJAMIN F. SPENCER.

REFERENCES CITED

The following references are of record in the file of this patent:

UNITED STATES PATENTS

| Number | Name | Date |
|---|---|---|
| 1,948,315 | Roberts | Feb. 20, 1934 |
| 2,008,261 | Roberts | July 16, 1935 |
| 2,018,569 | Pettengill et al. | Oct. 22, 1935 |
| 2,106,159 | Runge | Jan. 25, 1938 |
| 2,125,982 | Belleville | Aug. 9, 1938 |
| 2,163,403 | Meacham | June 20, 1939 |
| 2,303,862 | Peterson | Dec. 1, 1942 |
| 2,332,102 | Mason | Oct. 19, 1943 |
| 2,416,794 | Crosby | Mar. 4, 1947 |
| 2,447,375 | Taylor et al. | Aug. 17, 1948 |
| 2,453,243 | Mason | Nov. 9, 1948 |
| 2,459,557 | Usselman | Jan. 18, 1949 |
| 2,486,355 | Bussard | Oct. 25, 1949 |
| 2,505,655 | Van Weel | Apr. 25, 1950 |
| 2,515,225 | Holst et al. | July 18, 1950 |

FOREIGN PATENTS

| Number | Country | Date |
|---|---|---|
| 346,811 | Great Britain | Apr. 2, 1931 |